(12) United States Patent
Ulsh et al.

(10) Patent No.: US 7,284,657 B2
(45) Date of Patent: Oct. 23, 2007

(54) MODULAR CONVEYOR BELT WITH UNIQUE LINK CAPTURE MEANS

(75) Inventors: Larry P. Ulsh, Orange Park, FL (US); Michael Etherington, Duluth, GA (US)

(73) Assignee: Keystone Manufacturing, Inc., Rochester, PA (US)

( * ) Notice: Subject to any disclaimer, the term of this patent is extended or adjusted under 35 U.S.C. 154(b) by 78 days.

(21) Appl. No.: 10/532,186

(22) PCT Filed: Oct. 21, 2003

(86) PCT No.: PCT/US03/33356

§ 371 (c)(1), (2), (4) Date: Nov. 7, 2005

(87) PCT Pub. No.: WO2004/037685

PCT Pub. Date: May 6, 2004

(65) Prior Publication Data

US 2006/0124437 A1 Jun. 15, 2006

(51) Int. Cl.
*B65G 17/06* (2006.01)
(52) U.S. Cl. .................................................. 198/852
(58) Field of Classification Search ............... 198/851, 198/852, 853
See application file for complete search history.

(56) References Cited

U.S. PATENT DOCUMENTS

| | | |
|---|---|---|
| 3,055,488 A | 9/1962 | Stone |
| 4,949,838 A | 8/1990 | Lapeyre et al. |
| 4,953,693 A | 9/1990 | Draebel |
| 4,972,942 A * | 11/1990 | Faulkner ................. 198/853 |
| 5,435,435 A | 7/1995 | Chiba et al. |
| 5,558,208 A | 9/1996 | Kucharski |
| 5,662,211 A | 9/1997 | Quentin |
| 6,073,756 A * | 6/2000 | Damkj.ae butted.r et al. ................ 198/853 |
| 6,213,292 B1 | 4/2001 | Takahashi et al. |
| 6,216,854 B1 | 4/2001 | Damkjaer et al. |
| 6,237,750 B1 | 5/2001 | Damkjaer et al. |
| 6,345,715 B2 | 2/2002 | Palmaer |
| 6,662,938 B2 * | 12/2003 | Damkjaer ................. 198/852 |
| 7,073,662 B2 * | 7/2006 | Neely et al. ............. 198/850 |

* cited by examiner

*Primary Examiner*—Joe Dillon, Jr.
(74) *Attorney, Agent, or Firm*—Cohen & Grigsby, P.C.

(57) ABSTRACT

A flexible conveyor belt (10) has a plurality of transverse rods (11) on which a plurality of links are mounted for rotational and longitudinal movement on the rods. The links include edge links (12a, 12b) at opposite edges of the belt and link modules (13a, 13b and 15) positioned between the edge links. The rods have radially enlarged heads or buttons (16) on their ends, and the edge links have a cavity (29) for receiving the head, and an undercut shoulder (36) against which the head abuts to retain the edge link at the end of the rod. The link modules have a leading end (41) and a trailing end (42), and the trailing end of at least module (15) has slotted openings (47, 44) to enable the trailing end to be detachably connected to an associated rod. Disengagement of the detachable end of the link module from a rod provides more space on the rod so that the edge link can be slid on the rod to extend the end of the rod outwardly of the edge link to enable a head to be formed on the end of the rod without damaging the adjacent link.

12 Claims, 10 Drawing Sheets

MODULAR CONVEYOR BELT WITH UNIQUE LINK CAPTURE MEANS

TECHNICAL FIELD

This invention relates to conveyor belts, and more particularly to a modular spiral style conveyor belt having a plurality of molded plastic links movably mounted on transverse rods.

BACKGROUND ART

Numerous types of conveyors are used in a variety of industries for material handling. Prior art conveyors include conveyor belts made of metal, plastic or other materials. These belts generally are flexible to enable them to negotiate curves or turns, and conventional systems employ a variety of constructions to achieve the desired flexibility.

Spiral style conveyor belts, for example, have a plurality of links movably mounted on transverse rods. This permits the belt to articulate as it negotiates a turn. When a conveyor belt negotiates a turn, the outer edge of the belt is subjected to tension. These tension loads have a resultant force that is directed toward the center of the turn radius. This resultant force is resisted by the belt and/or the rods on which the belt links are mounted, before being transposed to the structure supporting the belt in the turn. The tighter the turn, the higher the resultant force.

On many conveyor belts the links on the outer edge are made stronger to accommodate the tension loads in a turn, but unless the outer link is captured by some means it will migrate inward along the rod when subjected to the resultant force, and can cause bending of the rods when the resultant force is strong enough. Bending of the rods will cause the belt to bow and the edge of the belt to flip up. Moreover, permitting the outer link to migrate inward along the rod causes a number of other problems, including crushing of the inner modules or causing the inner modules to fail over time due to fatigue.

U.S. Pat. Nos. 4,949,838, 5,662,211, 6,213,292, 6,216,854, 6,237,750 and 6,345,715 are exemplary of some prior art arrangements in which the outer link is retained at the end of the rod to prevent the rod from moving outwardly through the link. However, these prior art arrangements rely upon a snap fit engagement, or a separate stop plate, or the link may be welded in place in the case of some metal belts, to retain the outermost link in position at the outer end of the rod. These arrangements may not be secure enough to resist the forces involved, whereby the link can become displaced from the end of the rod, and/or the use of separate parts is required, which increases the complexity and cost of assembling the belt.

Further, in those belts having links or modules movably mounted on spaced transverse rods, the rods typically have heads, or the rod may be grooved to accept a means of retention such as a clip or pin, or buttons formed on their ends to prevent the links from sliding off the rods. To enable assembly of the belts, the head or button generally is formed on one end of the rod, and the links are then slid onto the rod from the opposite end, after which a head or button is formed on that end. This can pose a problem in those belts wherein the links are made of plastic, since heat generally is applied to the end of the rod during forming of the head or button, and the heat can damage the adjacent link. Conventional belts having separate links or link modules movably mounted to transverse rods typically have both ends of the links fully captured, i.e., non-removably attached to adjacent rods, and do not have any means to enable the endmost link to be moved out of the way when heat is applied to the end of the rod during formation of the head or button.

In other conventional conveyor belt systems, the links are integrally formed with the rods, or if made of metal, welded to the rods. This arrangement clearly would prevent the links from migrating inwardly along the rods, and would obviate the necessity of forming heads or buttons on the ends of the rods, but it is very difficult, if not impossible, to alter the configuration of the belt, i.e., add or remove links, or adjust the width of the belt, etc.

In still other prior art constructions both ends of the links are removably attached to respective adjacent rods. While alteration of the belt geometry is easier to accomplish with this construction, there is a tendency for the links to become dislodged from the rods as the belt moves around a pulley or sprocket, or when engaged by a scraper.

Further, some prior art constructions attach the link to the end of the rod by welding, or a section or all of the plastic is completely removed to prevent heat damage to the plastic part. This allows the plastic part to become dislodged from the rods as the belt moves around a pulley or sprocket, or when engaged by a scraper.

Accordingly, there is need for a spiral style conveyor belt having separate links and link modules movably mounted on spaced transverse rods, wherein the outermost edge links are securely captured on the ends of the rods to prevent migration of the links inward along the rods when the belt negotiates a turn.

Further, there is need for a conveyor belt having separate links and link modules movably mounted on spaced transverse rods, wherein one end of at least some of the links is removably attached to the rod to enable the combined width of the links to be reduced to expose an end of the rod so that a head or button can be formed on the rod end without damaging the adjacent link.

DISCLOSURE OF THE INVENTION

The flexible conveyor belt of the invention comprises a plurality of links rotatably and slidably mounted on a plurality of spaced elongate rods extending transversely to the longitudinal direction of the belt, defining a support surface for supporting articles to be conveyed. As used herein, the term "links" includes both individual links and link modules. Link modules comprise multiple sections integrally joined together, with each section being generally equivalent to a single "link".

By capturing the outermost edge link on the rod so that it cannot move inwardly along the rod, the invention solves the problem of migration of the outermost links inwardly along the rods as the belt negotiates a turn. More particularly, the edge link is constructed so that the button or head on the end of the rod is securely retained in the link. This is accomplished by providing a shaped cavity in the edge link to capture the radially enlarged head on the rod, preventing the link from moving inwardly on the rod. A slot is formed through the outer wall of the link, which also forms the outer boundary of the shaped cavity, through which the enlarged head of the rod can be snapped to position the head in the shaped cavity. The slot is narrower at one end, and an undercut shoulder is defined at that end. The underside of the outer wall of the link, through which the slot is formed, is tapered so that the head of the rod is urged toward said one end and beneath the undercut shoulder. In a preferred embodiment, a stop tab or lug is provided in the slot opposite the location of the shoulder to prevent the enlarged head of the rod from moving along the cavity and away from the shoulder. This lug is shaped so that during assembly the enlarged head of the rod can be moved past the lug and through the slot into the cavity.

Formation of the head or button on the end of the rods without causing damage to the adjacent link is accomplished in the invention by making one end of at least some of the links releasable from the transverse rod and pivoted about their other end, which is permanently attached to an adjacent rod. The links are narrower at one end than the other, and by pivoting at least one of the links upwardly about the rod, the links remaining attached to the rod may be slid along the rod to space the outermost edge links from a rod end, whereby a head or button may be formed on the rod end (which typically requires the application of heat) without causing damage to the adjacent link. Moreover, since one end of the link or link module is permanently captured on a rod, the link cannot become inadvertently detached from the belt, as sometimes happens with conventional links that have both ends releasably attached to the rods. Thus, the links in the belt of the invention will not become dislodged from the belt as the belt moves around a sprocket, for example, or when the belt is engaged by a scraper.

The end of the link that is snapped onto the rod is the trailing end. Accordingly, in the event that the snap-on end has become loose or partially loosened from its associated rod, when the belt passes by a scraper, the scraper engages the link and pushes it down to securely engage the snap-on end with the rod. In conventional belts having both ends of the link snap-engaged with the rods, the scraper can completely dislodge the link when it passes the scraper.

The outermost link, or edge link, can have a hold-down tab formed on its underside at the outer edge. The hold-down tab engages a track or rail on the belt support structure to hold the outer edge of the belt down as the belt negotiates a turn. Hold-down tabs can be provided on the outermost link at both edges of the belt, or on only one edge, depending upon whether the belt is intended to negotiate both left and right hand turns, or turns only in one direction.

In the particular embodiment shown and described herein, except for the outermost links on each rod, the remaining links are integrally joined or grouped together in modules. By combining modules of appropriate lengths, belts of various widths can be constructed. Most belts have a width of twenty inches or more, and in one embodiment of the invention, for example, modules having lengths of four, six and/or ten inches can be combined to produce belts of different width, varying in two inch increments. Of course, modules of different length can be used to produce belts having different widths.

The links in the belt of the invention preferably are made of plastic, and the rods of metal. The belt is thus especially suited for use with food products, particularly frozen or very cold products, and has superior strength to all-plastic belts.

BRIEF DESCRIPTION OF THE DRAWINGS

The foregoing as well as other objects and advantages of the invention will become apparent from the following detailed description when considered in conjunction with the accompanying drawings, wherein like reference characters designate like parts throughout the several views, and wherein.

DETAILED DESCRIPTION OF THE PREFERRED EMBODIMENTS

Figure 1:
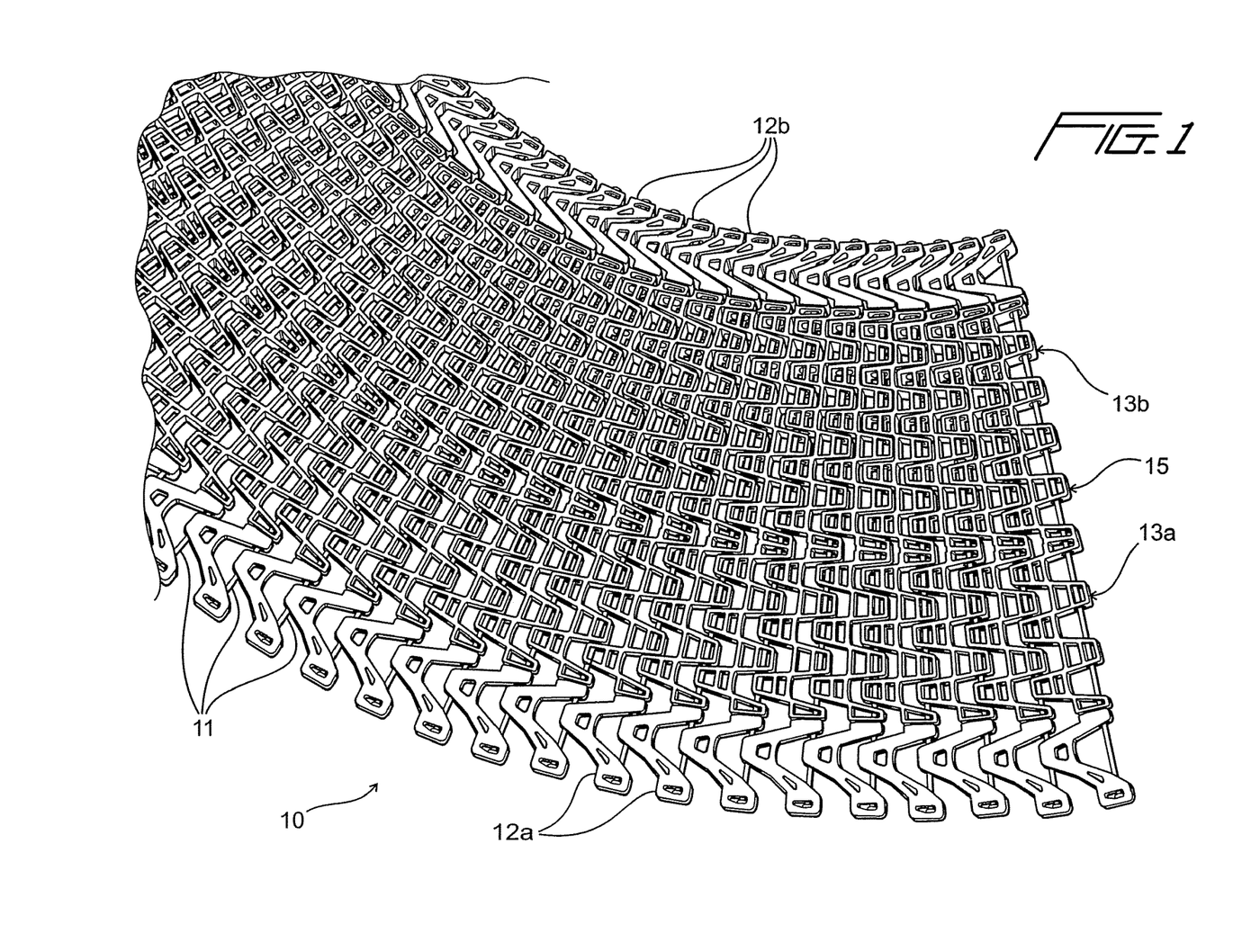
FIG. 1 is a top perspective view of a fragment of a belt according to the invention, showing how it would appear when negotiating a right hand turn, for example.
Figure 2:
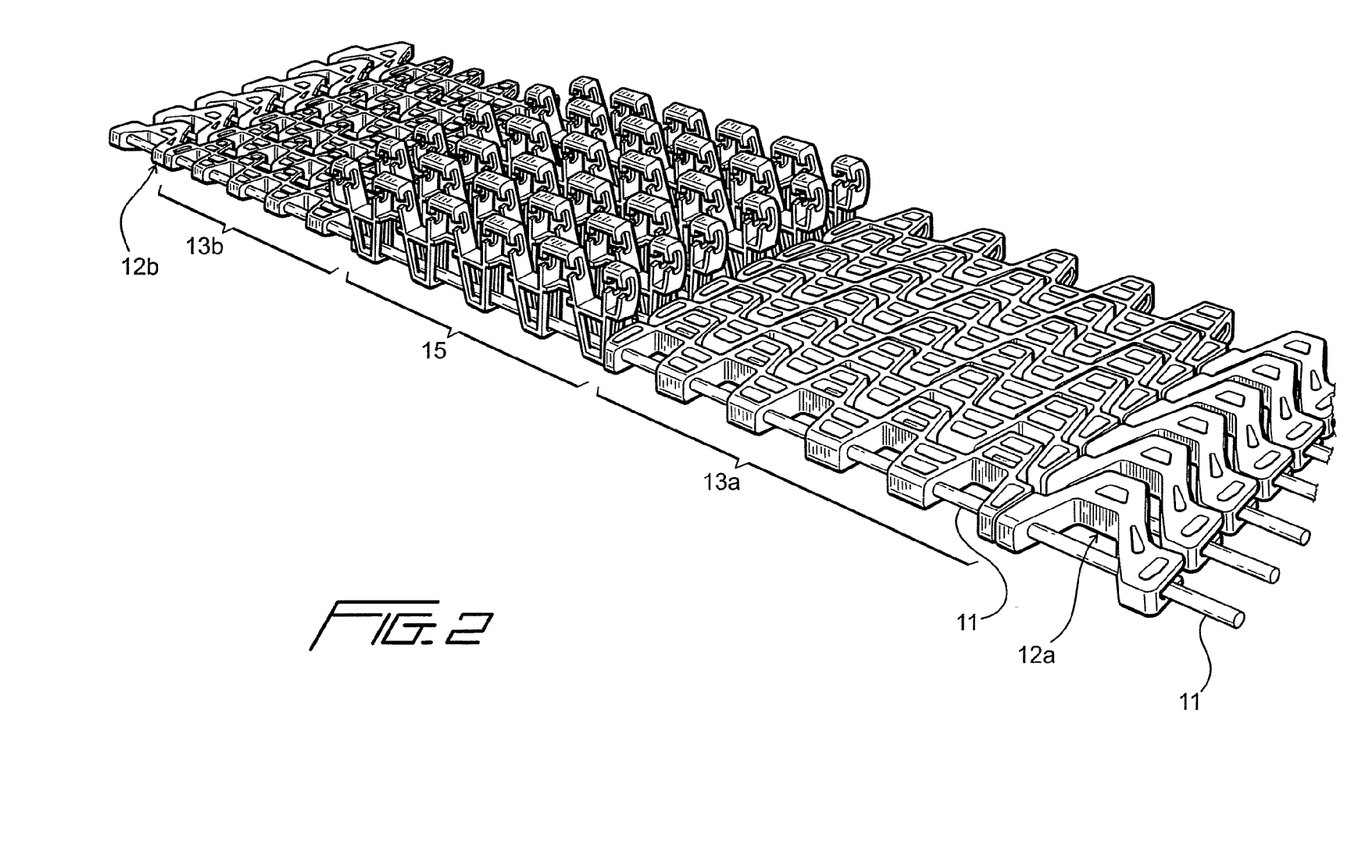
FIG. 2 is a top perspective view of a fragment of a belt according to the invention, having link modules with one end disengaged from the associated rod and pivoted upwardly, and showing the remaining links, including fully captured link modules on each side of the snap-on modules, and edge links incorporating the rod capture feature of the invention, moved longitudinally on the rods so that one end of the rods projects beyond the edge links to enable a head or button to be formed on the extended rod ends.
Figure 3:
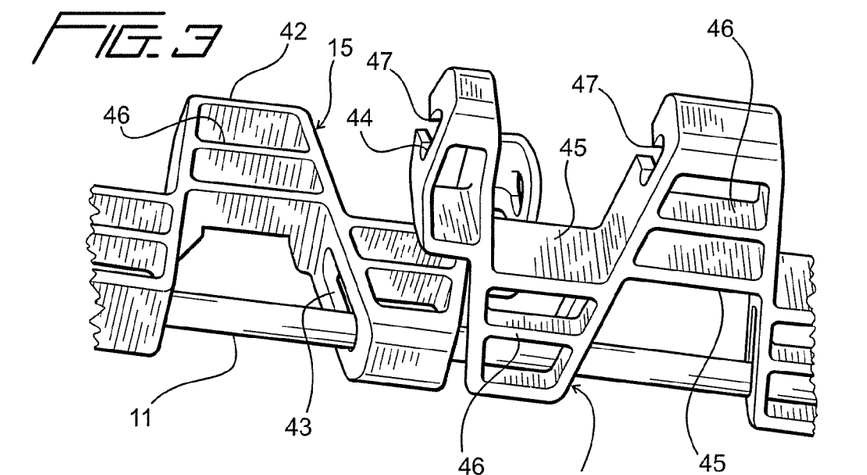
FIG. 3 is an enlarged fragmentary perspective view showing a detachable link module pivoted up around the permanently attached end, to enable it to be slid lengthwise along the rod.
Figure 4:
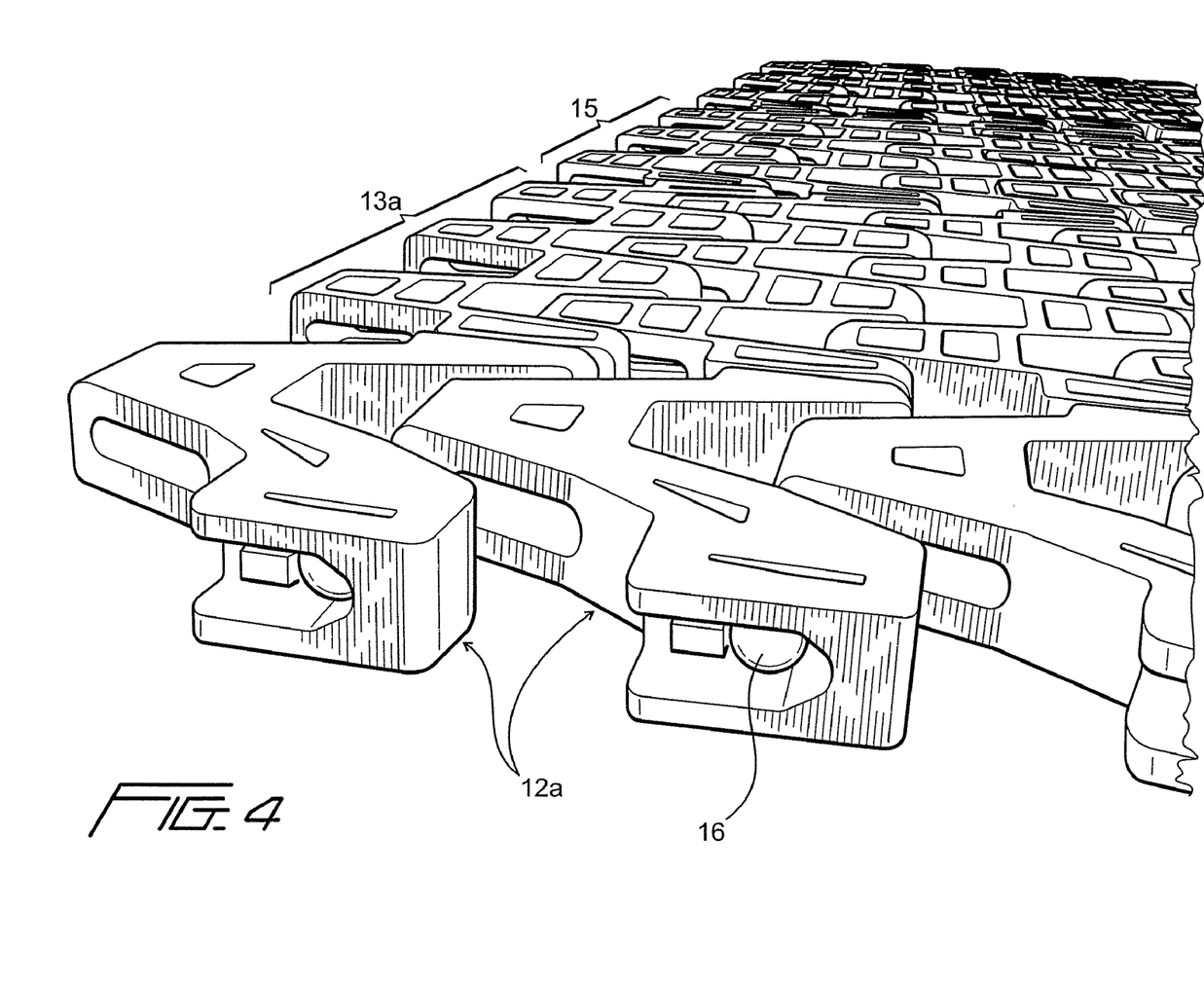
FIG. 4 is a perspective end view of a portion of an assembled belt according to the invention, showing the headed rod ends captured in the end links.

A portion of a belt in accordance with the invention is indicated generally at 10 in FIGS. 1 and 2. The belt comprises a plurality of transverse, spaced apart metal rods 11 on which, in the particular example illustrated, are movably mounted edge links 12a and 12b at opposite ends of the rods, link modules 13a and 13b that are non-releasably attached at both ends to respective adjacent rods, and link modules 15 that are non-releasably attached at one end to a rod and releasably attached at their other end to an adjacent rod. The link modules are placed on the rods so that the releasable end of modules 15 is the trailing end. As described in more detail hereinafter, and as seen best in FIGS. 1, 3, 13, 14 and 19, the openings in the links and link modules through which the rods pass are elongate so that when the belt negotiates a turn, as depicted in FIG. 1, the belt can compress at its inner edge and expand at its outer edge to accommodate the radius of the turn.

To insure that the links do not migrate inwardly along the rods toward the center of radius of a turn as the belt negotiates the turn, the outermost edge links 12a and 12b are securely connected to the ends of the rods. In this regard, the outer ends of the rods have a button or head 16 formed on them that retain the links on the rods, and the edge links 12a and 12b are constructed to securely engage this head to prevent the edge links from moving away from the end of the rod.

The edge links 12a and 12b are identically constructed and are generally A-shaped, with a top surface 17, a bottom surface 18, a relatively narrow forward or leading end 19, and a pair of divergent legs 20 and 21 extending therefrom to enlarged feet or base portions 22 and 23. A connecting web 24 extends between the legs spaced from the leading end 19. Elongate openings 25 extend through the legs between the leading end 19 and web 24 for receiving a rod 11. Slightly elongated openings 26 and 27 are also formed through the feet 22 and 23 for receiving an adjacent rod.

The foot or base portion 23 has a shaped opening 29 extending through it from the top surface 17 through the bottom surface 18, and a slot 30 formed through the outer wall 31, leading from the trailing edge of opening 27 and through the leading edge 32 of the foot 23. The shaped opening 29 has a tapered or sloping surface 33 extending rearwardly from a narrowed forward end 34 of the slot to a point approximately midway the length of the slot.

Figure 7:
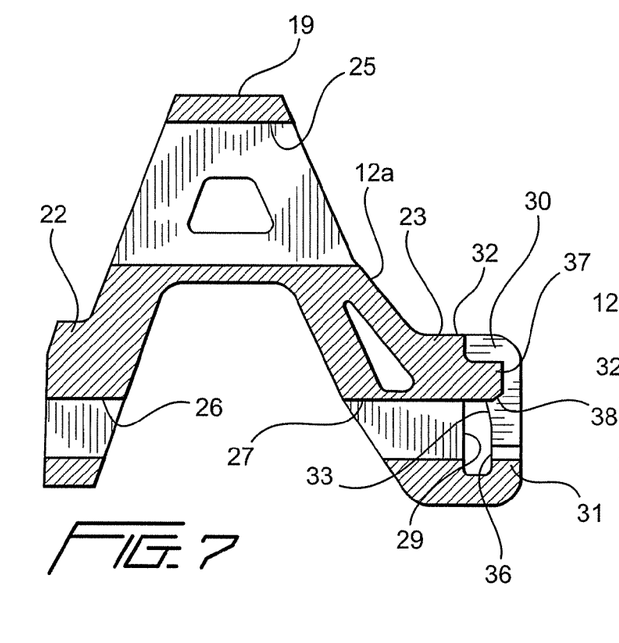
FIG. 7 is a sectional view taken through the link of FIG. 6.
Figure 8:
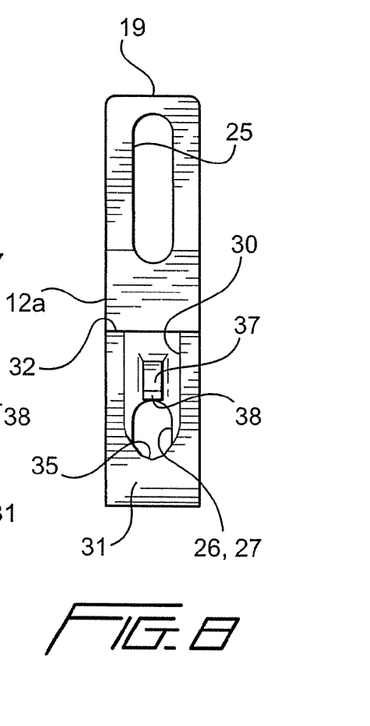
FIG. 8 is an end view in elevation of the link of FIG. 6.
Figure 9:
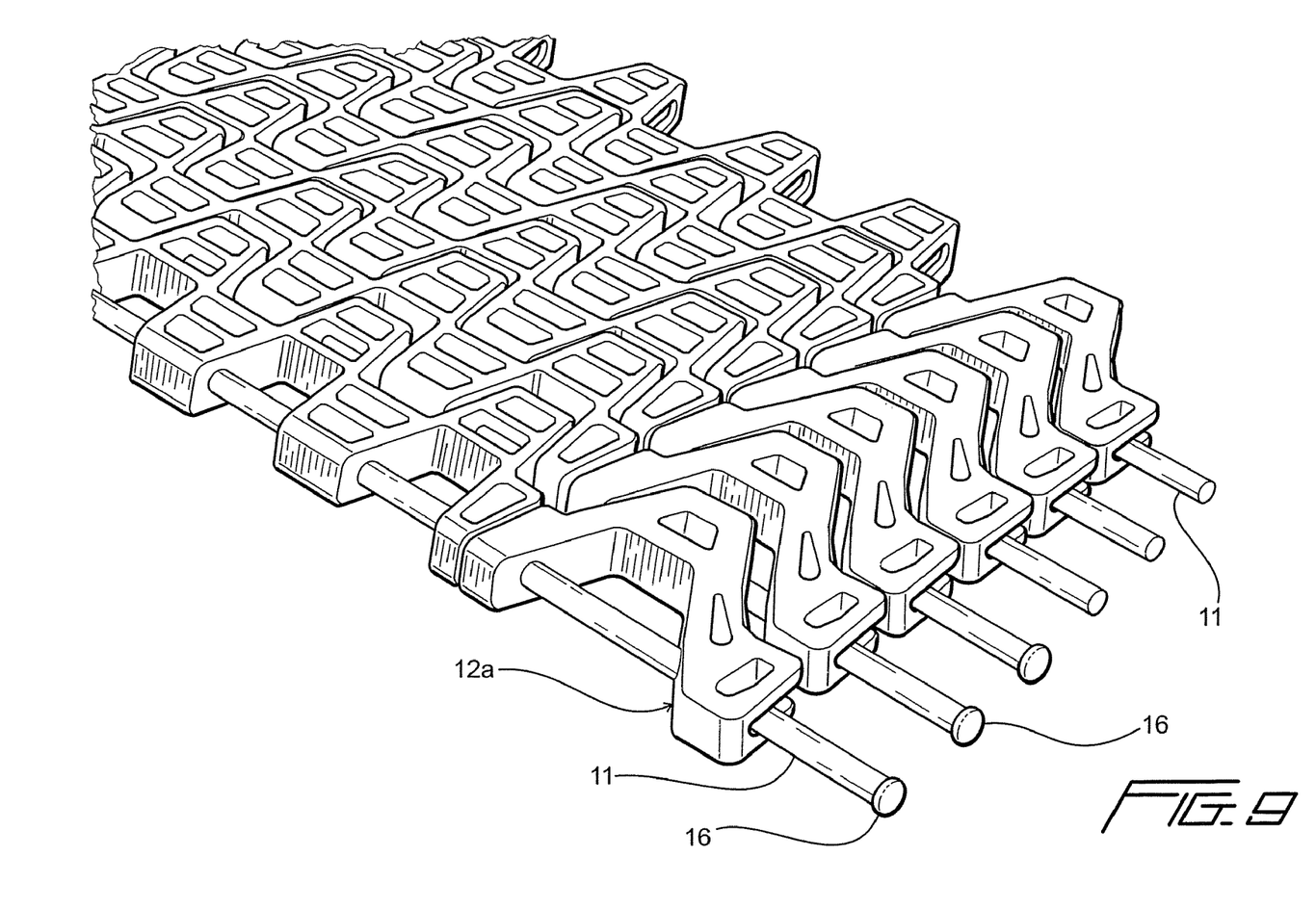
FIG. 9 is a fragmentary top perspective view of a portion of the belt of FIG. 4, showing the links moved longitudinally on the rods so that the rods project at one end beyond the edge links on that side of the belt, and showing some of the rods with heads formed thereon and other rods without the heads yet being formed.
Figure 10:
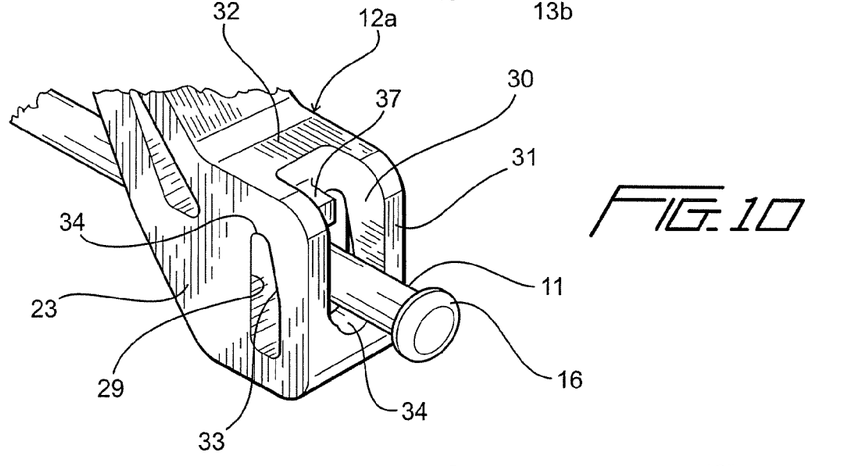
FIG. 10 is an enlarged fragmentary perspective view of a portion of the link of FIG. 5, showing the headed end of the rod extending from the link before it is snapped into the slot.
Figures 11, 12, 18:
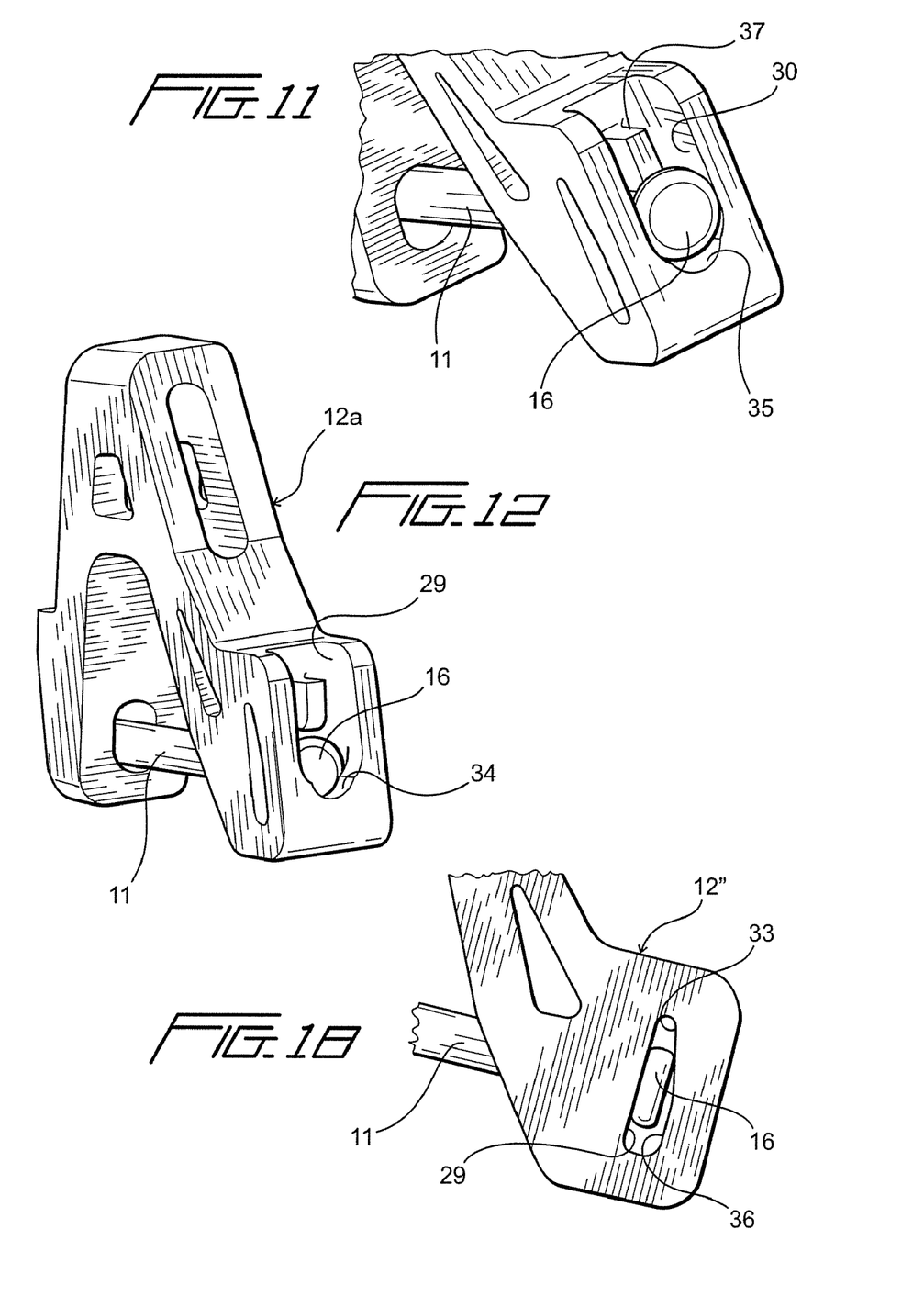
FIG. 11 is a view similar to FIG. 10, showing the headed end of the rod partially engaged in the slot but before it is fully snapped into place.
FIG. 12 is a perspective end view of the link of FIG. 6, showing the headed end of the rod fully snapped into place and captured in the cavity in the link.
FIG. 18 is an enlarged fragmentary plan view of a portion of the link of FIG. 16, showing how the headed end of the rod engages against the tapered surface and is urged thereby toward the undercut shoulder.
Figure 13:
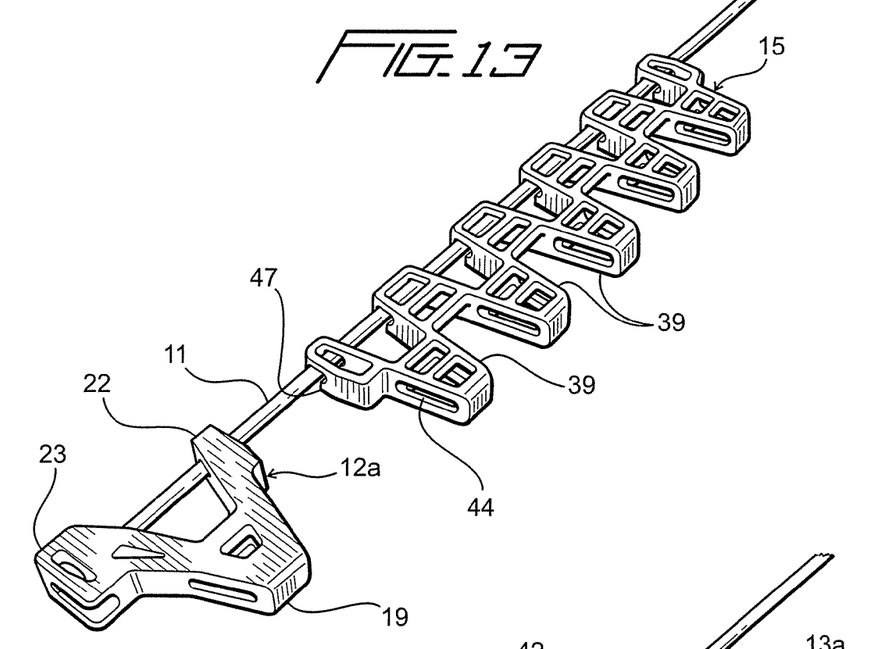
FIG. 13 is a top perspective view of an edge link and a detachable link module assembled on a rod.

As seen best in FIGS. 10, 11 and 12, the slot 30 is narrowed at 35 toward the trailing edge of the link, and the shaped opening 29 extends into the foot 23 past the margin of opening 27, defining an undercut shoulder 36 in the outer wall. A stop lug or tab 37 is formed in the slot 30, projecting slightly more than half way through the slot and located approximately midway the length of the tapered surface 33. See FIGS. 7, 10 and 11. The outer edge of the lug facing the narrowed end of the slot is tapered at 38 for a purpose described below.

Figure 14:
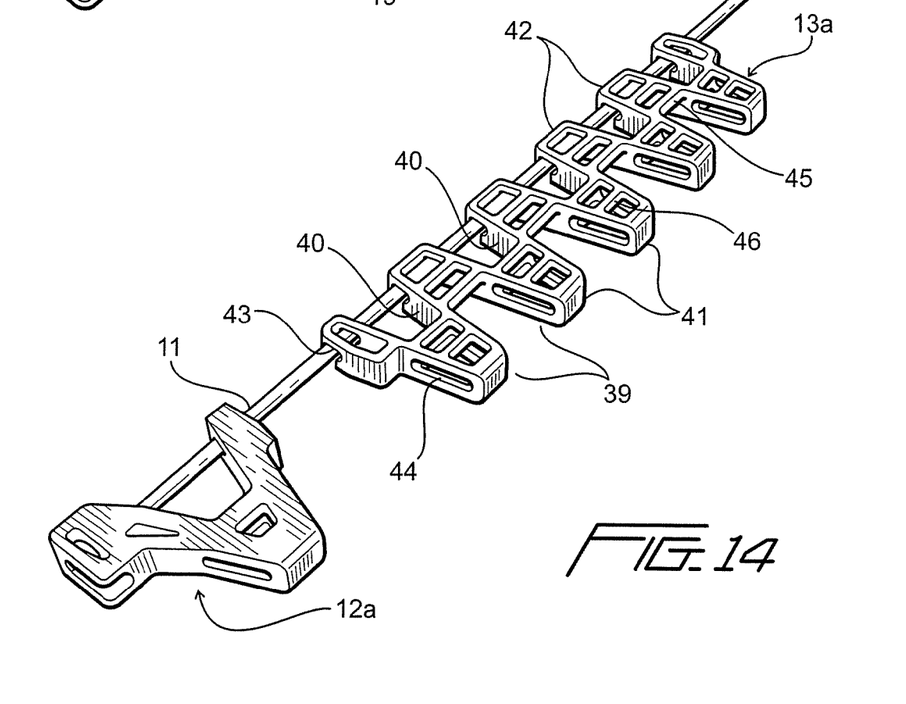
FIG. 14 is a top perspective view of an edge link and module constructed for non-releasable attachment at both ends to a rod, shown attached at one end to a rod.

The link modules 13a and 13b are identically constructed, and only module 13a will be described in detail, with reference to FIG. 14. In the particular example shown, link module 13a is the equivalent of five individual links integrally joined together in edge to edge relationship and has a length of about ten inches, although it should be understood that the module can have other lengths, e.g., four, six or ten inches. Since most belts have a width of twenty inches or more, by properly combining the modules these dimensions enable belts of different widths to be built in two-inch increments.

Modules 13a and 13b each comprise a series of oppositely oriented, generally A-shaped segments 39, with adjacent segments sharing a common leg 40. The module has a forward or leading end 41 and a trailing end 42, and the apex of the segments on the leading end is narrower than the apex of the segments on the trailing end. Elongate closed openings 43 and 44 are formed through the legs near the leading and trailing edges, respectively, and a first web or band 45 extends between the legs approximately midway between the leading and trailing ends of the module, with the webs in adjacent segments slightly offset from one another. A second web or band 46 extends between the legs of each segment approximately midway between the first web and the adjacent end of the segment. The web 46 joins the legs on only one side of the openings 44, at what comprises the top surface of the module in an assembled belt. When rods 11 are passed through the openings 43 and 44, both ends of the modules 13a and 13b are captured on the rods and are non-removable therefrom unless slid off the end of the rod.

Module 15 is similarly constructed, except that a slot 47 is formed through the legs at one side of the opening 44 adjacent the trailing end of the module to enable that end of the module to be snapped onto and off of an associated rod 11. In this regard, the width of the slot 47 is slightly narrower than the diameter of the rod, so that some force is required in order to apply or remove that end of the module from the rod. It will be noted that the slot 47 is on the underside of the module in an assembled belt. Accordingly, objects on the belt, or a scraper contacting the belt, tend to force the removable end of the module back into snapped engagement with the rod in the event that end should become loosened from the rod, which might occur, for example, when the belt moves around a roller that is contaminated with ice or product build-up.

To assemble the particular belt 10 shown in the drawings, the unheaded end of a rod 11 with a head 16 on the other end is passed through the openings 26 and 27 of an edge link 12a and the link is slid along the rod until it comes against the head 16. The diameter of the head is about the same as or slightly larger than the width of the slot 30, and the distance between the narrowed end of the slot and the stop lug is slightly less than the diameter of the head, whereby when the head is inserted into the slot, it is engaged between the tapered surface 38 and the narrowed portion of the slot. By exerting force on the link, it can be pressed through the slot and past the tapered surface to beneath the undercut shoulder 36, whereupon the stop lug prevents the head from moving from beneath the shoulder and the link is thus securely held to the headed end of the rod and cannot move inwardly on the rod away from the headed end. A module 13a is then slid onto the rod by passing the rod through the openings 43 and sliding the module along the rod until it abuts against the link 12a. Next, the rod is inserted through the openings 43 in a detachable module 15 and the module is slid along the rod until it abuts the module 13a. This is followed by a module 13b, which is followed by a link 12b. In connection with the foregoing, it should be understood that it is possible to build this belt with only the two outer links and one detachable module. The narrowest belt currently produced is twenty inches wide, but the belt can have other widths and other combinations of links and/or modules. See page 11, lines 11-21, below.

A second rod is then passed through the openings 25 in links 12a and 12b, through the openings 44 in the other ends of the modules 13a and 13b, and optionally through the openings 44 in the other end of the module 15. The process is continued until as many rods and associated links and modules are assembled as desired.

Either by not passing the rod through the openings 44 in the end 42 of modules 15, or by unsnapping the end 42 from the associated rod after the module has been slid onto the rod, the modules 15 can be pivoted upwardly as shown in FIG. 2, whereby the modules 13a and links 12a can be slid further along the rod, exposing the unheaded ends of the rods and spacing the links 12a from the unheaded ends. Heads or buttons 16 can then be formed on the exposed ends of the rods without causing damage to the adjacent links.

Links 12a can then be slid outwardly on the rods and secured to the adjacent ends of the associated rods by pressing the heads 16 through the slots 30, past the tapered surface 38, and beneath the undercut shoulder 36, whereby both edge links 12a and 12b are securely retained at the outer ends of the rods 11, preventing migration of the links and modules inwardly along the rods when the belt negotiates a turn. The module 15 is then properly positioned and the previously detached end snapped down onto the associated rod to complete the assembly.

Although a particular sequence of operation and arrangement of modules has been described, it should be understood that a different number and/or arrangement of modules could be used, as desired, in order to achieve particular belt geometries. The invention is not limited to this particular sequence and arrangement, but is more concerned with the structure and function of the rod capture feature on the outermost edge links 12a and 12b, which prevents migration of the links and modules inwardly along the rods when the belt negotiates a turn, and the pivotable modules 15 with a captured leading edge and releasable trailing edge to enable the links and modules to be moved inwardly on the rods to expose an end of the rods for formation of a head thereon, while at the same time insuring that the modules remain securely attached to the belt under conditions likely to be encountered during operation of the belt.

Figures 5, 6, 15:
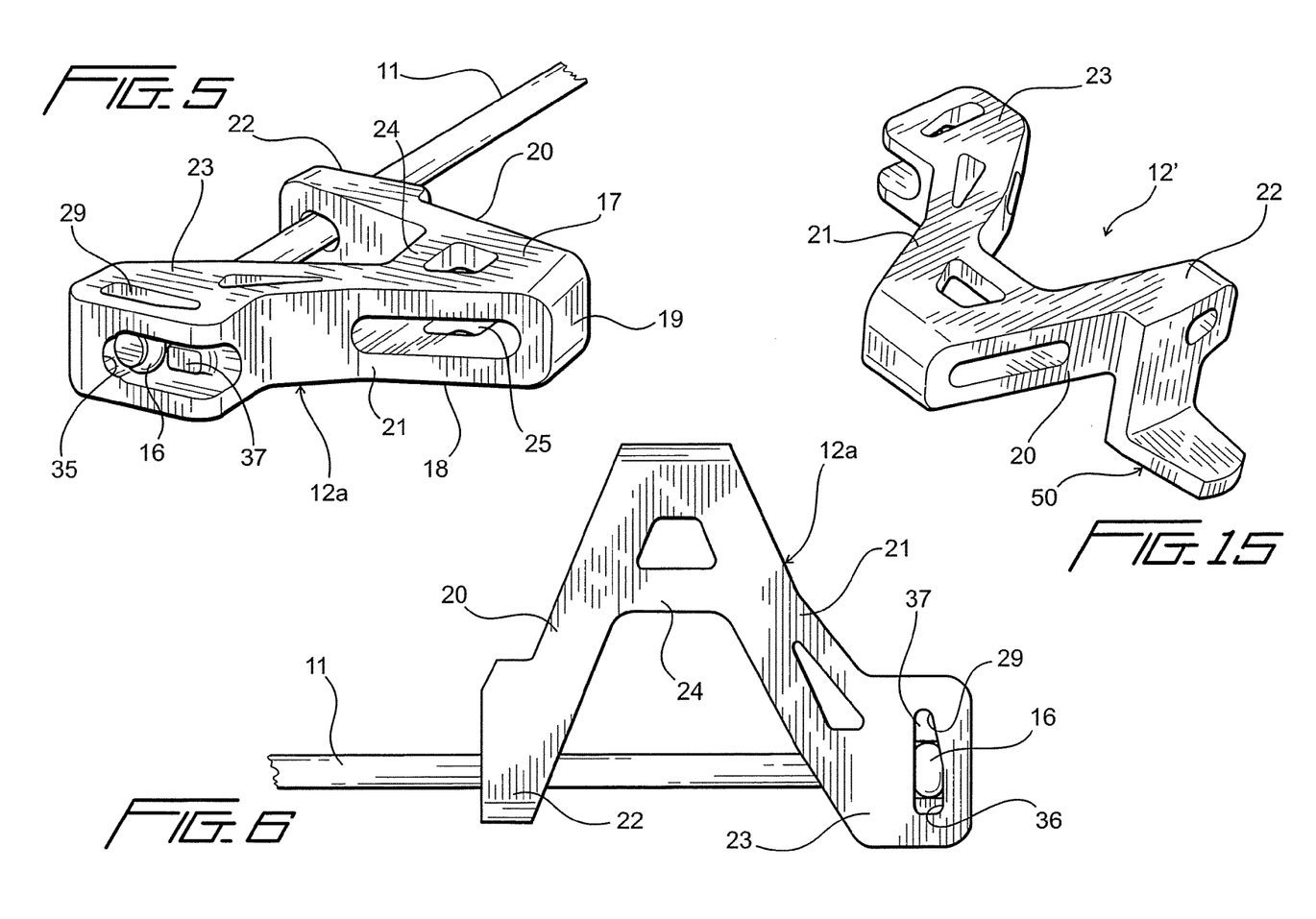
FIG. 5 is a perspective end view of one of the edge links and a portion of an associated rod, showing in more detail the rod capture feature of the edge link.
FIG. 6 is a top plan view of the edge link and associated rod of FIG. 5, showing how the stop tab engages the headed end of the rod to prevent it from moving from beneath the undercut shoulder.
FIG. 15 is a top perspective view of an edge link having a hold-down tab on its outer edge.

A modified edge link 12' is shown in FIG. 15. This link is identical to the links 12a and 12b previously described, except that it has a hold-down tab 50 formed on the underside of the outer edge of the link. This tab rides beneath a rail (not shown) mounted to the belt support structure beneath the edge of the belt and prevents the edge of the belt from lifting up as it negotiates a turn. A hold-down tab can be provided on either or both links 12a and 12b at opposite edges of the belt, depending on whether the belt is intended to negotiate only right- or left-hand turns, or both.

Figure 16:
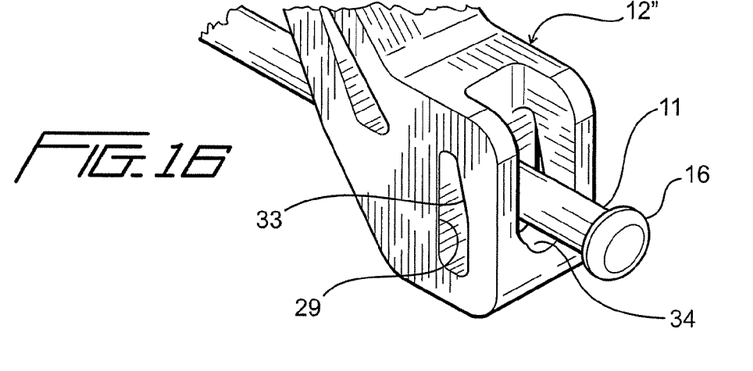
FIG. 16 is a view similar to FIG. 10, but showing an alternate embodiment wherein the stop tab is omitted.
Figure 17:
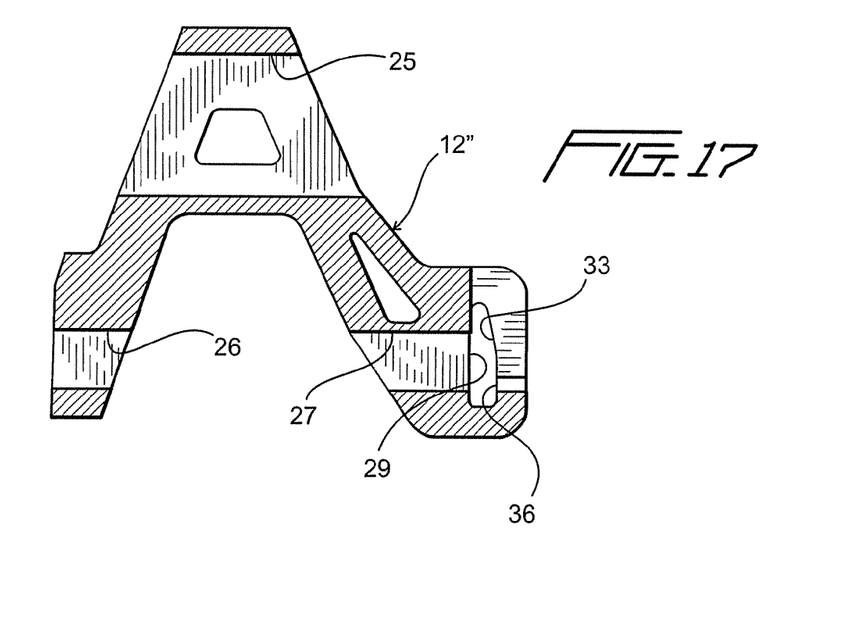
FIG. 17 is a sectional view of the link of FIG. 16.
Figure 19:
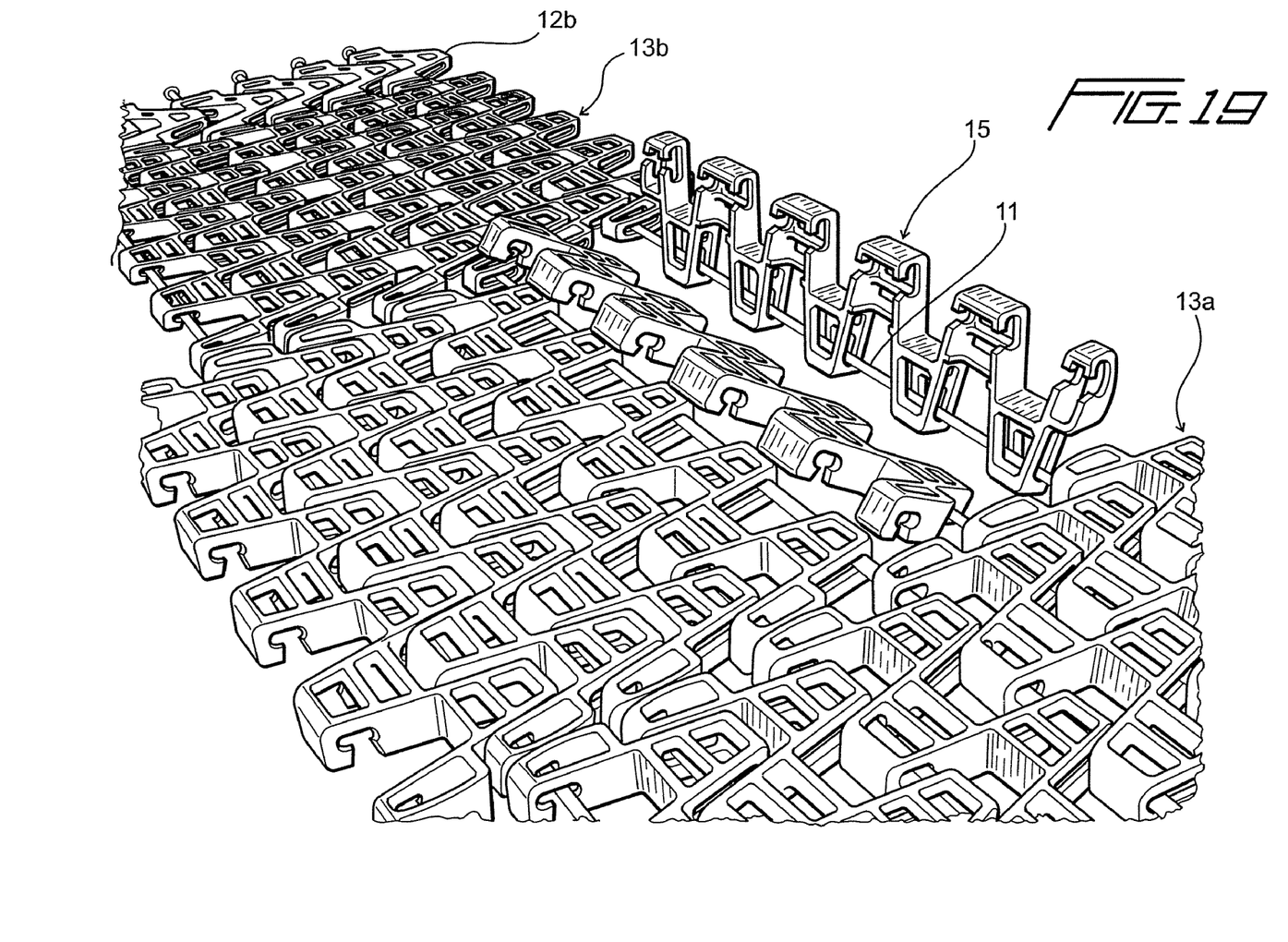
FIG. 19 is a slightly enlarged, fragmentary top perspective view of a portion of a belt according to the invention, showing some of the snap-on link modules fully engaged on their associated rods, others in a position about to be engaged, and still others in a fully upright position.

A further modified link 12" is shown in FIGS. 16, 17 and 18. This link is identical to the links 12a and 12b previously described, except that the stop lug 37 and its attendant function are omitted. In this form of the invention, the sloping surface 33 is relied upon to keep the head 16 of rod 11 urged toward the narrowed end 34 and undercut shoulder 36. In this regard, when a force is applied against the link tending to move it inwardly on the rod, the head engages the sloping surface, producing a resultant force in the direction of the undercut shoulder, and the head slides along the sloping surface in that direction.

Although particular embodiments of the invention are illustrated and described in detail herein, it is to be understood that various changes and modifications may be made to the invention without departing from the spirit and intent of the invention as defined by the scope of the appended claims.

What is claimed is:

1. A conveyor belt having a length direction and a width direction, comprising: a plurality of links rotatably and slidably mounted on a plurality of spaced elongate rods extending transversely to the length direction to define a movable flexible belt having a support surface for supporting and conveying articles; said links including edge links at opposite side edges of the belt, said edge links having aligned openings therethrough for receiving a rod; said rods having radially enlarged ends defining a head on each end of the rod; and edge links rod capture means for engaging the head on the end of the rod to retain the edge link at the end of the rod, said rod capture means comprising a shaped cavity in each of said end links, and a shaped slot extending through a side edge of each of said end links and communicating with the cavity, said shaped slot defining an undercut shoulder under which the head on the rod is captured when the head is inserted through said slot and into said cavity, thereby preventing the link from moving longitudinally on the rod.

2. A conveyor belt as claimed in claim 1, wherein: said slot has a width slightly smaller than the diameter of the head but through which the head can be snap-fitted.

3. A conveyor belt as claimed in claim 2, wherein: the slot is narrower at one end than the other, said narrower end defining said undercut shoulder.

4. A conveyor belt as claimed in claim 1, wherein: said edge links have a leading end and a trailing end, and openings through each end for receiving a respective rod of a pair of spaced adjacent rods.

5. A conveyor belt as claimed in claim 4, wherein: said rod capture means is formed in the trailing end of the edge link.

6. A conveyor belt as claimed in claim 1, wherein: said links include at least one link module positioned on the rods between the edge links, said link module having a leading end and a trailing end, one of said ends being detachably connected to one rod and the other end being non-detachably connected to an adjacent rod, whereby said link module may be detached at its detachable end from said one rod and pivoted upwardly about the adjacent rod to provide space on said one rod for sliding an edge link inwardly on said one rod to space the end of that rod from the adjacent edge link, whereby a head can be formed on the spaced end of the rod without causing damage to the adjacent edge link.

7. A conveyor belt as claimed in claim 6, wherein: the end of the link module that is detachably connected to a rod is the trailing end.

8. A conveyor belt as claimed in claim 7, wherein: the link module comprises a plurality of generally A-shaped segments integrally joined together in side-by-side relationship and each having a pair of divergent Legs extending from a narrow end, with adjacent segments oppositely oriented in respective forward and rearward directions relative to the length direction of the belt and sharing a common leg, whereby one A-shaped segment extends forwardly at its narrow end and an adjacent segment extends rearwardly at its narrow end.

9. A conveyor belt as claimed in claim 8, wherein: a connecting web extends between the divergent legs of each segment approximately midway between the leading and trailing ends of the link module, the webs in adjacent segments being slightly offset from one another in the length direction of the belt.

10. A conveyor belt as claimed in claim 9, wherein: aligned openings are formed through the legs near the narrow end of each segment for receiving the rods, whereby a rod is received in an opening at each end of the link module.

11. A conveyor belt as claimed in claim 10, wherein: the openings are elongate in a direction parallel to the length direction of the belt, whereby the rods received in the openings can move toward and away from one another, and the links can move toward and away from one another in a direction parallel to the length direction of the belt to enable the belt to negotiate turns.

12. A conveyor belt as claimed in claim 11, wherein: a slot is formed in each leg in the trailing end of the link module, said slots opening into the elongate openings in those legs, whereby the trailing end of the link module can be snap-fitted onto an associated rod and removed therefrom.

* * * * *